(12) United States Patent
Harding et al.

(10) Patent No.: US 9,764,657 B2
(45) Date of Patent: Sep. 19, 2017

(54) ELECTRICAL VEHICLE WITH CONTROL SYSTEM

(71) Applicant: Segway Inc., Bedford, NH (US)

(72) Inventors: Matthew J. Harding, Hooksett, NH (US); William J. Twomey, Manchester, NH (US); Robert M. Bowman, Bow, NH (US)

(73) Assignee: Segway Inc., Bedford, NH (US)

( * ) Notice: Subject to any disclaimer, the term of this patent is extended or adjusted under 35 U.S.C. 154(b) by 71 days.

(21) Appl. No.: 14/683,647

(22) Filed: Apr. 10, 2015

(65) Prior Publication Data

US 2015/0352976 A1   Dec. 10, 2015

Related U.S. Application Data

(60) Provisional application No. 61/977,957, filed on Apr. 10, 2014.

(51) Int. Cl.

| | |
|---|---|
| *B62D 61/06* | (2006.01) |
| *B62K 5/003* | (2013.01) |
| *B62K 5/027* | (2013.01) |
| *B60L 15/20* | (2006.01) |
| *A61G 5/04* | (2013.01) |
| *B60L 11/18* | (2006.01) |
| *B62K 3/00* | (2006.01) |
| *B62K 5/025* | (2013.01) |

(52) U.S. Cl.
CPC ........... *B60L 15/20* (2013.01); *B60L 11/1818* (2013.01); *B62K 3/002* (2013.01); *B62K 5/025* (2013.01); *B62K 5/027* (2013.01); *B62K 2204/00* (2013.01); *Y02T 10/7258* (2013.01)

(58) Field of Classification Search
None
See application file for complete search history.

(56) References Cited

U.S. PATENT DOCUMENTS

| | | | | |
|---|---|---|---|---|
| 8,167,074 | B1 * | 5/2012 | Tsiyoni | B60T 11/04 180/208 |
| 8,849,490 | B2 * | 9/2014 | Wyatt | B60L 3/00 180/65.1 |
| 9,411,340 | B2 * | 8/2016 | Kamen | A63C 17/01 |
| 2006/0213711 | A1 * | 9/2006 | Hara | A63C 17/0033 180/181 |
| 2011/0209929 | A1 | 9/2011 | Heinzmann et al. | |
| 2014/0008138 | A1 | 1/2014 | Kim et al. | |

FOREIGN PATENT DOCUMENTS

GB   2491136   11/2012

* cited by examiner

*Primary Examiner* — Thomas G Black
*Assistant Examiner* — Demetra Smith-Stewart
(74) *Attorney, Agent, or Firm* — Burns & Levinson LLP; Joseph M. Maraia

(57) ABSTRACT

A standup, electrically powered three-wheeled vehicle has safety features in its control and method of operation.

12 Claims, 7 Drawing Sheets

ELECTRICAL VEHICLE WITH CONTROL SYSTEM

CROSS REFERENCE TO RELATED APPLICATIONS

This application claims priority from U.S. Provisional Patent Application Ser. No. 61/977,957, filed Apr. 10, 2014, and incorporated herein by reference in its entirety.

FIELD OF THE INVENTION

The present invention generally relates to three wheeled electrically driven vehicles, and in particular to such devices upon which a rider stands.

BACKGROUND OF THE INVENTION

Electrically powered, standup vehicles are becoming more widely used in populated areas for providing powered transportation over greater than walking distances without the size, cost and inconvenience of an automobile. Such vehicles provide desirable views of surroundings, including both scenery, pedestrians and riding surface conditions. Like any powered vehicles, safety issues are always a consideration even when such vehicles are used by responsible adults, such as public safety personnel. Therefore, it is generally desirable to build safety features into normal vehicle operation.

SUMMARY OF THE INVENTION

One embodiment of the present invention provides electrically driven, stand-up vehicle, comprising: a pair of laterally opposed rear wheels for supporting the vehicle; one or more forward steered wheels; one or more electric drive motors coupled to the pair of rear wheels to propel the vehicle; a computerized controller for the one or more electric drive motors having a memory storing instructions which when executed cause the controller to: sense a state switch for applying forward or reverse drive power to the at least one drive motor; sense a speed of the vehicle; sense a rider selected level for applying drive current to the one or more drive motors; and enable changing of the state switch to a different forward or reverse state only when the sensed speed and the sensed rider selected level are below predetermined levels.

The memory may further include instructions which when executed: sense for a plurality of conditions of the vehicle; and enable connection of the rider selected current to the one or more drive motors only when the sensed plurality of conditions all agree with predetermined settings. The plurality of conditions of the vehicle may be selected from the group consisting of: the presence of a rider on the vehicle; fault conditions within an electrical system of the vehicle; vehicle direction of movement; battery charge level; the absence of an external connection of charging power; and an activated braking mechanism. The instructions which sense the presence of a rider on the vehicle may sense a pair of redundant sensors.

The memory may further comprise instructions which when executed: control power to the one or more electric drive motors coupled to propel the vehicle; sense wheel speed of each of the pair of rear wheels; determine a difference in wheel speed between the rear wheels; and determine power to the one or more drive motors in response to the determined wheel speeds and difference between the wheel speeds to limit calculated lateral acceleration on the vehicle when the difference in wheel speeds represents a turn radius for the vehicle that is less than a limit depending upon sensed average wheel speed.

The one or more electric drive motors may comprise a separate respective drive motor coupled to each of the pair of rear wheels, and further wherein the memory further comprises instructions which when executed: sense user controlled steering of the one or more forward steered wheels and determine power to the separate respective drive motors in response to the sensed steering to match rotation of the rear wheels with the user controlled steering.

Another embodiment of the present invention provides a method for controlling an electrically driven, stand-up transportation vehicle, comprising: using a state switch for applying forward or reverse drive power to one or more drive motors; sensing a speed of the vehicle; sensing a rider selected level for applying drive current to the one or more drive motors; and enabling changing of the state switch to a different forward or reverse state only when the sensed speed and the sensed rider selected level are below predetermined levels.

The rider selected level may determine torque applied to the one or more drive motors.

The method may further comprise determining a forward or reverse drive power selection with a switch. The method may further comprise: sensing for a plurality of conditions of the vehicle; enabling connection of the rider selected power to the one or more drive motors only when the sensed plurality of conditions all agree with predetermined settings. The plurality of conditions of the vehicle may be selected from the group consisting of: the presence of a rider on the vehicle; fault conditions within an electrical system of the vehicle; vehicle direction of movement; battery temperature; battery charge level; the absence of an external connection of charging power; and an activated braking mechanism. Sensing the presence of a rider on the vehicle may use a pair of redundant sensors. Sensing the presence of a rider on the vehicle may be responsive to a predetermined minimum weight sensed on the vehicle. The step of sensing an external connection for charging power may comprise sensing for an alternating current (AC) voltage on a recharging input of the vehicle.

The method may further comprise: controlling power to one or more electric drive motors connected to propel the vehicle; sensing wheel speed of each of the laterally opposed wheels; determining a difference in wheel speed between the laterally opposed wheels; and determining power to the one or more drive motors for the step of controlling in response to the determined wheel speeds and difference between the wheel speeds to limit calculated lateral acceleration on the vehicle when the difference in wheel speeds represents a turn radius for the vehicle that is less than a limit depending upon sensed wheel speed. The step of determining power may comprise determining an average wheel speed from the sensed wheel speeds of each of the laterally opposed wheels.

The plurality of conditions of the vehicle may be selected from the group consisting of: the presence of a rider on the vehicle; a selected forward or reverse drive state; fault conditions within an electrical system of the vehicle; vehicle speed; vehicle direction of movement; battery temperature; battery charge level; and a braking mechanism.

BRIEF DESCRIPTION OF THE DRAWINGS

The present invention is illustratively shown and described in reference to the accompanying drawings, in which.

DETAILED DESCRIPTION OF THE DRAWINGS

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

Figure 1A:
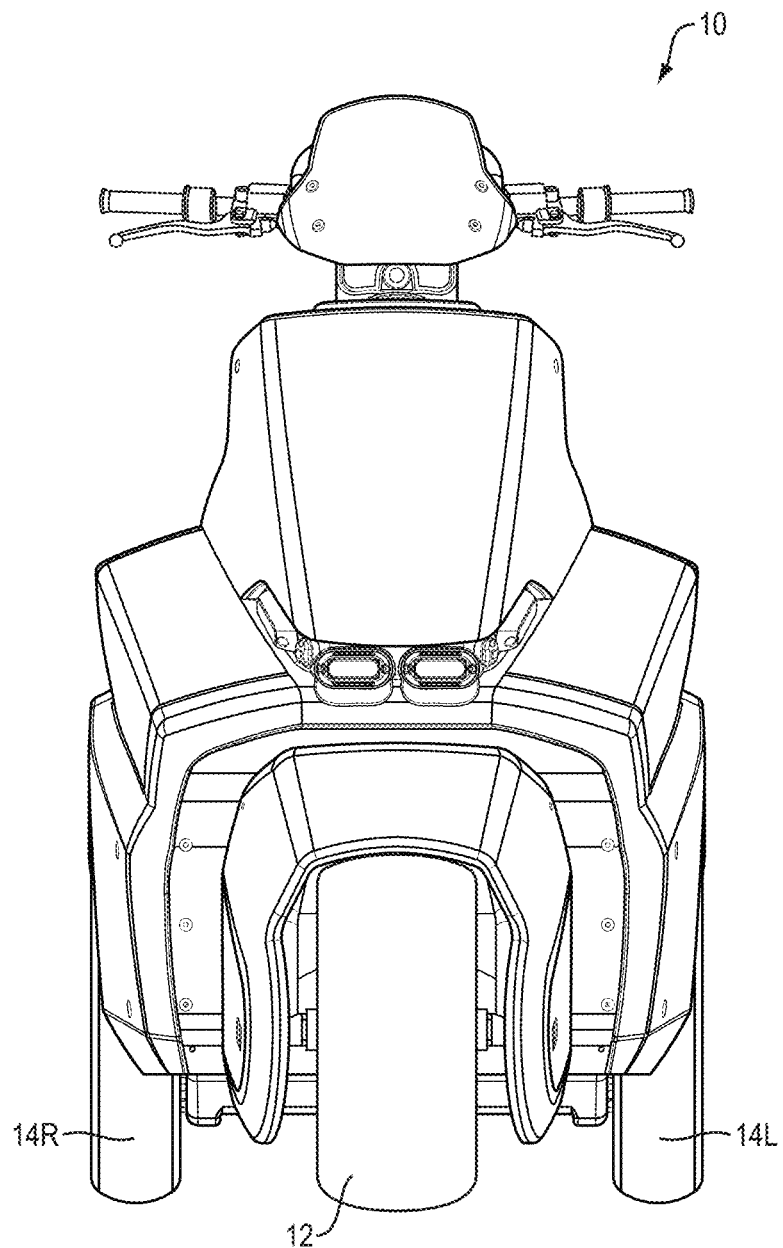
FIGS. 1A and 1B show front and side view images, respectively, of a 3-wheeled standup vehicle.
Figure 1B:
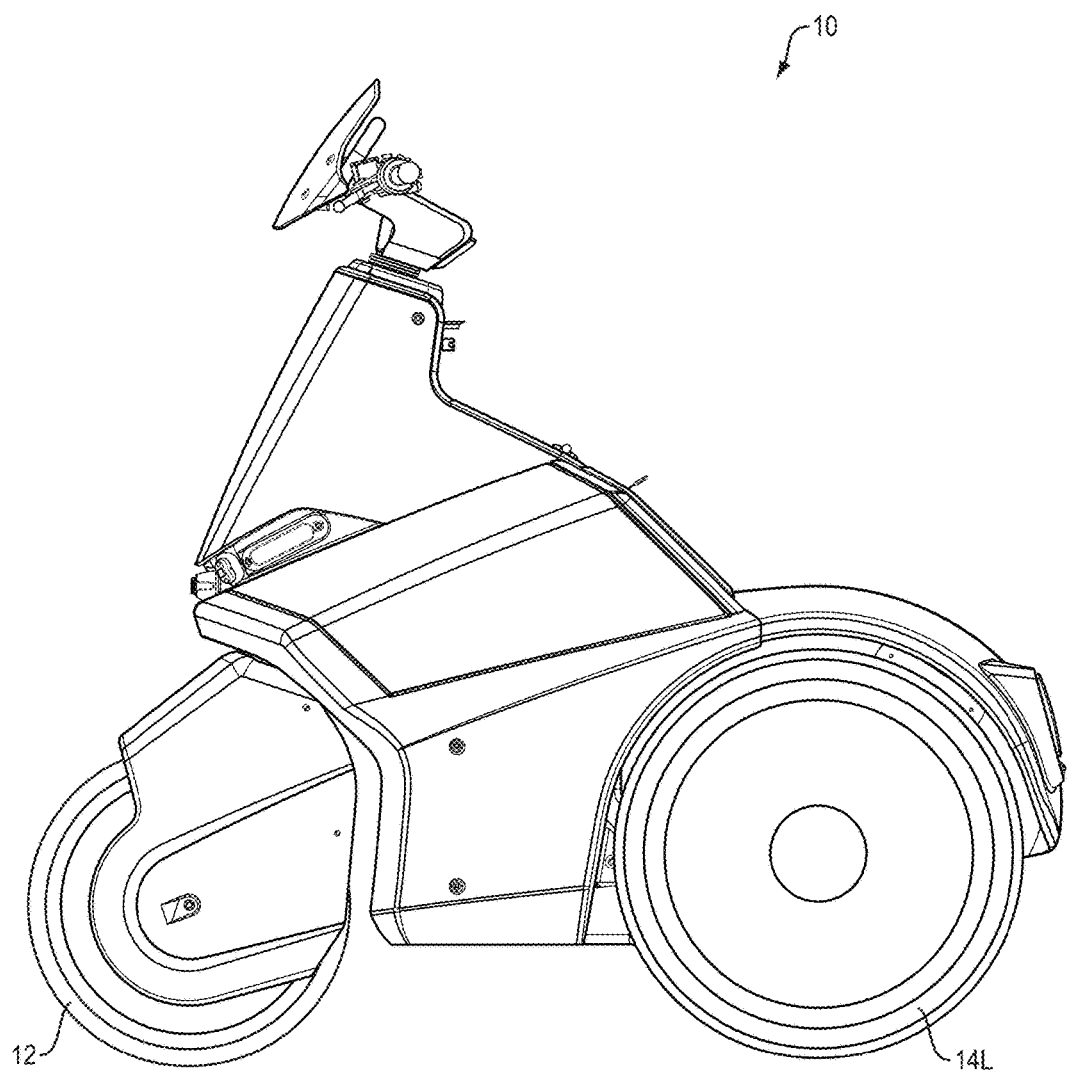

FIGS. 1A and 1B show a three-wheeled, stand-up, electric vehicle 10 having one front steered wheel 12, and two rear fixed driven wheels 14L and 14R. Each driven wheel 14L, 14R has a separate drive and motor and is referred to herein as Left (L) and Right (R).

Figure 2:
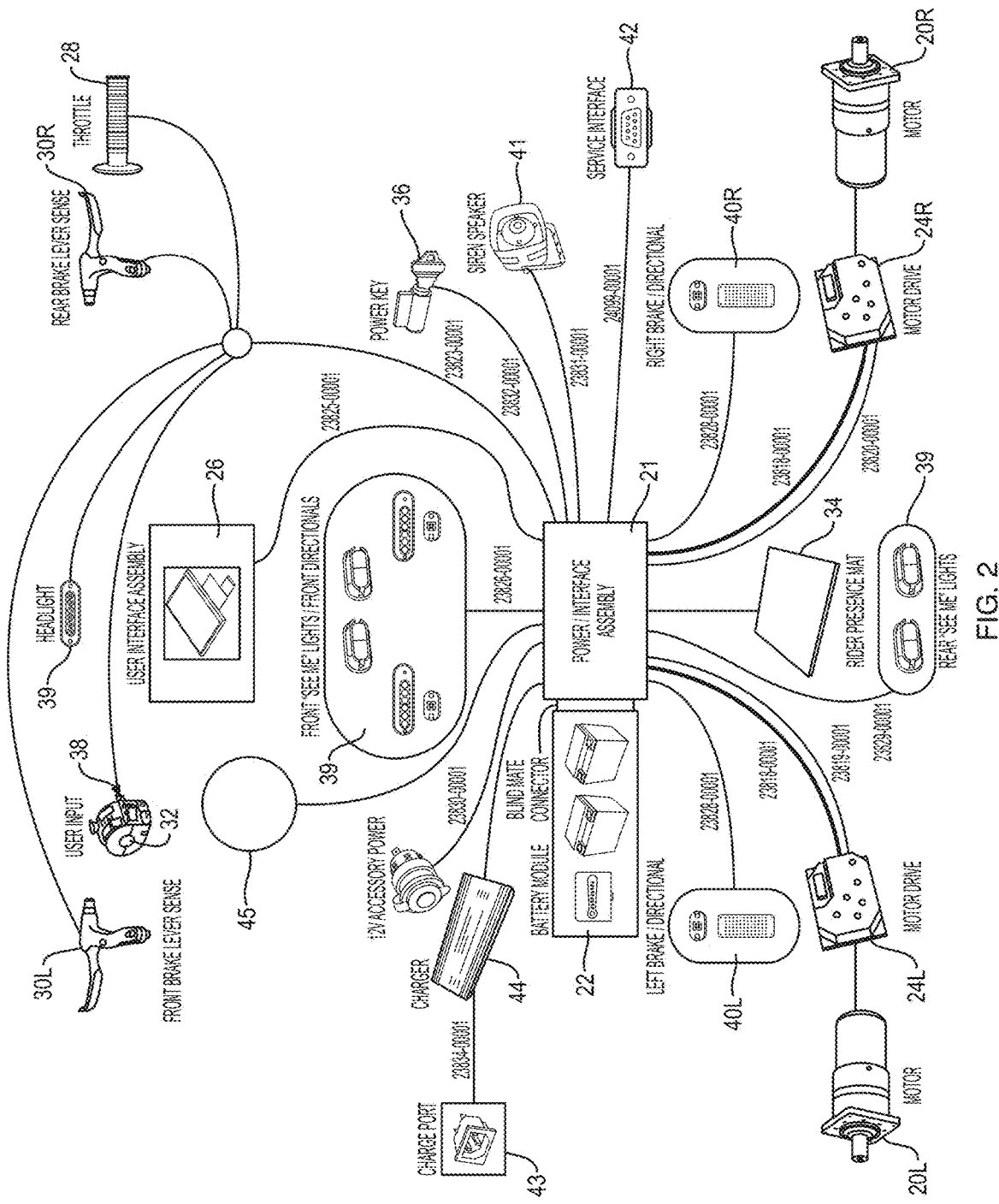
FIG. 2 shows a circuit schematic suitable for use with the vehicle of FIG. 1 and constructed in accordance with an embodiment of the present invention.

FIG. 2 shows a schematic diagram of circuitry suitable for controlling and propelling the vehicle of FIG. 1. Generally included are left and right drive motors 20L, 20R, power/interface assembly 21, battery 22, motor controllers 24L, 24R, a graphic user interface 26, and multiple input devices. User inputs include: a throttle 28 having an analog output indicating desired torque; a pair of brake lever switches 30L, 30R indicating activation of hydraulic brakes for front wheel 12 and rear wheels 14L,14R, respectively; a single-pole-single-throw (SPST) reverse switch 32 enabling forward/reverse mode selection; and a rider detect sensor 34 used to indicate rider presence to avoid accidental drive power unless a rider is properly mounted. Power for the vehicle 10 is controlled by a 2-position ON-OFF key switch 36 and a mode toggle switch 38 for selecting between accessory mode and drive mode. Switches 36 and 38 provide the conditions of: Off—no power applied to any electronics when key switch 36 is off; Accessory—power is provided to motor drive logic circuitry and other electronics (lights, sirens, etc) when Key switch 36 is on and toggle switch 38 is set to Accessory; and Drive—power is enabled to the motor drive bridge, and is also otherwise controlled when Key switch 36 is on and toggle switch 38 is set to Drive. All of these devices, along with additional lights and back up indicators are coupled through the power/interface assembly 21. Toggle switch 38 and reverse switch 32 may be constructed as part of a single multi-switch assembly as shown. Also shown are various external vehicle lights 39, directional indicator lights 40 L, 40 R, a reverse audio alarm 41, a computer service interface 42, a charge port 40 3A converter/charger 44 and a turn sensor 45. Turn sensor 45 measures the turn angle of the vehicle handlebars, which measurement may be used as part of vehicle control.

Control logic for the present apparatus is preferably built into the left motor controller 24L and includes software stored in memory and a processor for executing the software. The motor controllers are preferably identical and may be any suitable programmable motor controller, such as a Kollmorgen ACS48XS. Different software can be run on each controller depending upon whether it is installed on the left or right side.

Figure 3:
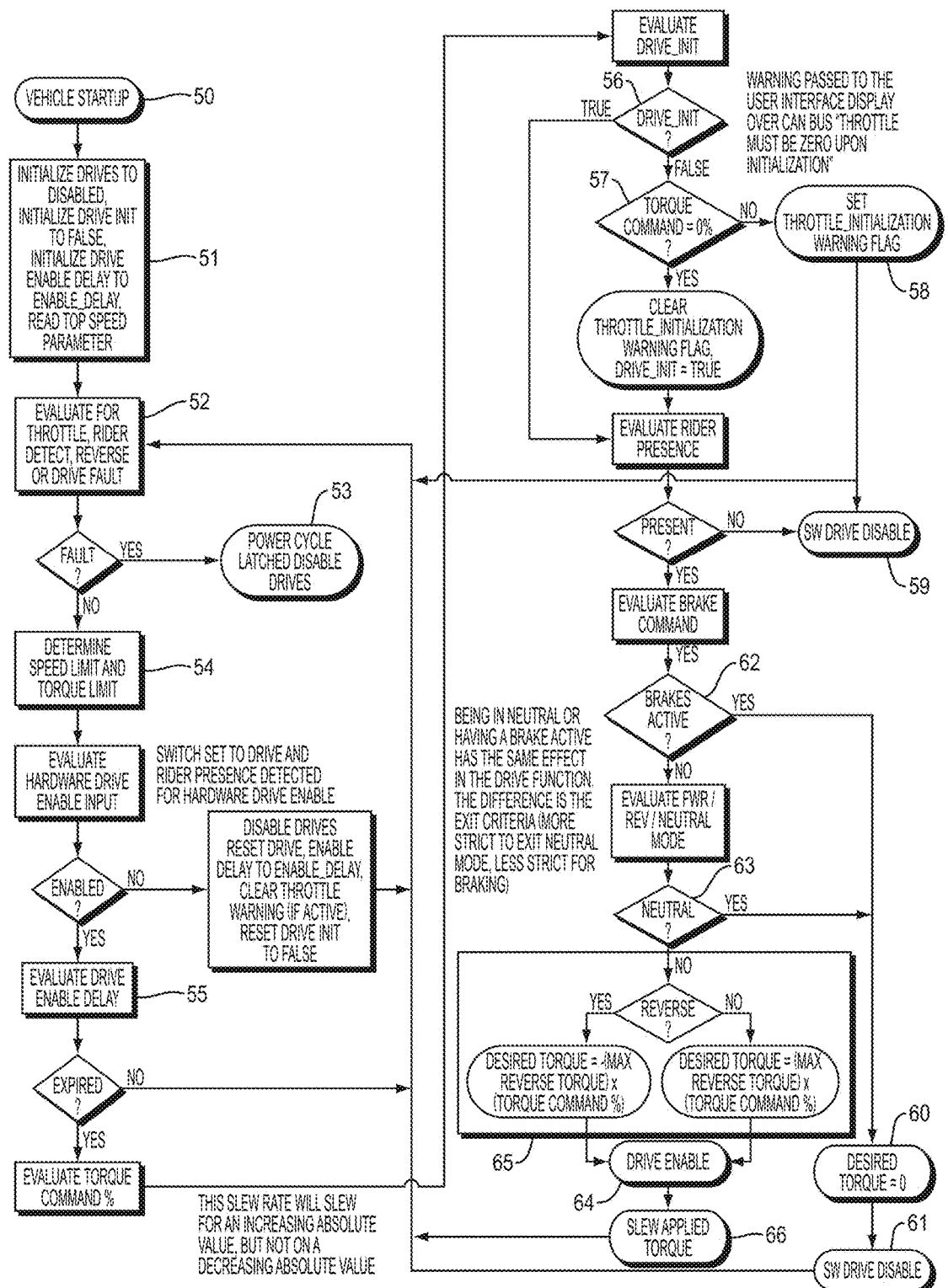
FIG. 3 shows a software logic diagram of a portion of a control function suitable for use with the schematic of FIG. 2.

FIG. 3 is a software sequence diagram describing an overall control function incorporating the functions mentioned above. The logic diagram begins with vehicle startup 50, and variables are initialized in step 51. Various fault conditions are evaluated in step 52. If a fault condition exists, the motor drives will enter a faulted state 53, and will not re-enable until the next power cycle. A predetermined speed limit is read from switches on the circuit board, and the selected motor current limit is set in step 54. Next, the drive enable signal 108 (FIG. 6), is evaluated. If enable signal 108 is low, the flow loops back and evaluates for faults. If the enable signal is high, it delays briefly, then evaluates the desired torque command at 55. If the drives have not yet initialized at 56, meaning that this loop has not been completed fully, the throttle is checked to ensure it is at a command of zero at 57. If the throttle is not at zero, a warning 58 is displayed to the rider until the throttle is set to zero.

If a rider is not detected to be present, the drives are disabled at 59, and the control flow loops back. Otherwise, the control flow continues. If both of the brakes are applied at 62, the motor torque is set to zero at 60, and the drives are disabled at 61. Also, if the direction mode is neutral at 63, the motor torque is set to zero at 60, and the drives are disabled at 61. Otherwise, the torque is set based on the maximum torque, torque percent command, and direction mode at 65, the drives are enabled at 64, and the output to the motors is slewed at 66.

Although the control steps described above function in a current control or torque mode, similar programming may be used to operate the vehicle in a voltage control or speed monitoring mode. An optional adaptation of this voltage control mode would be to sense the position of turn sensor 45 (FIG. 2) and use any sensed turning of the front wheel to proportionately drive the motors 20L, 20R to match the user selected turn radius, such as in sequence steps 65. This configuration would better enable the use of a smaller turn radius is and thereby improve the mobility of the vehicle. It would also reduce wheel slippage during turning and operability factors dependent thereon.

Figure 4:
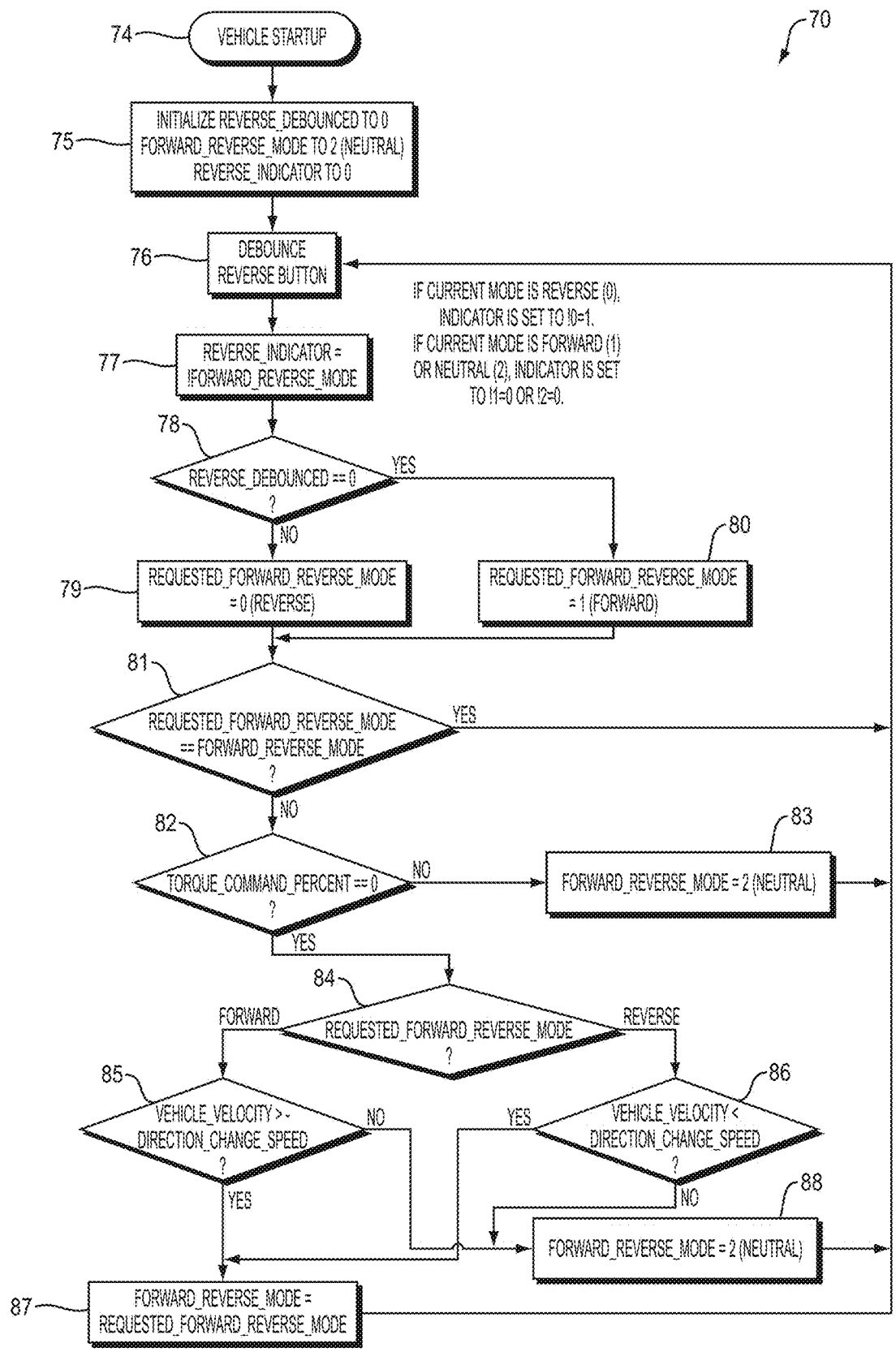
FIG. 4 shows a software logic diagram of a portion of a control function concerning forward and reverse control of the vehicle and suitable for use with the schematic of FIG. 2.

FIG. 4 shows a software sequence diagram of one embodiment of the reverse mode selection described above. The process 70 starts with vehicle startup 74 and setting of flags for reverse_debounced to 0, forward_reverse_mode to 2 (neutral) and reverse_indicator to 0. If reverse button 32 (FIG. 2) is pressed, step 76 debounces the input to remove any input oscillations, and the requested reverse/forward mode is selected according in steps 78, 79, 80. If the requested mode is the same as the actual mode, as detected in step 81, no further action is needed. If the requested mode and the actual mode are not equal, further checks are made. The torque command is checked in step 82 to make sure that is at or below a predetermined value, such as zero. If not, the forward_reverse_mode is set to the value 2 for neutral. If torque is at or below the predetermined value, vehicle speed is checked in step 86 to insure that it is below a predetermined value. A sufficiently low speed determined in step 86 enables the requested mode to be entered in step 87, while too high a speed causes selection of neutral mode in step 88.

The same process 70 also controls the selection of forward mode from reverse mode using the same checks of throttle torque and vehicle speed, prior to changing the drive mode. Failure of the torque and speed checks likewise results in neutral mode selection.

Another feature available on vehicle 10 is rider detection as a safety feature to insure that a rider is properly positioned on the vehicle to avoid runaway conditions and improper vehicle use. This function is provided in the present application both as a software sequence and via a parallel logic circuit. A minimum weight requirement may be built into the sensors 34 to prevent vehicle operation by juveniles.

Figure 5:
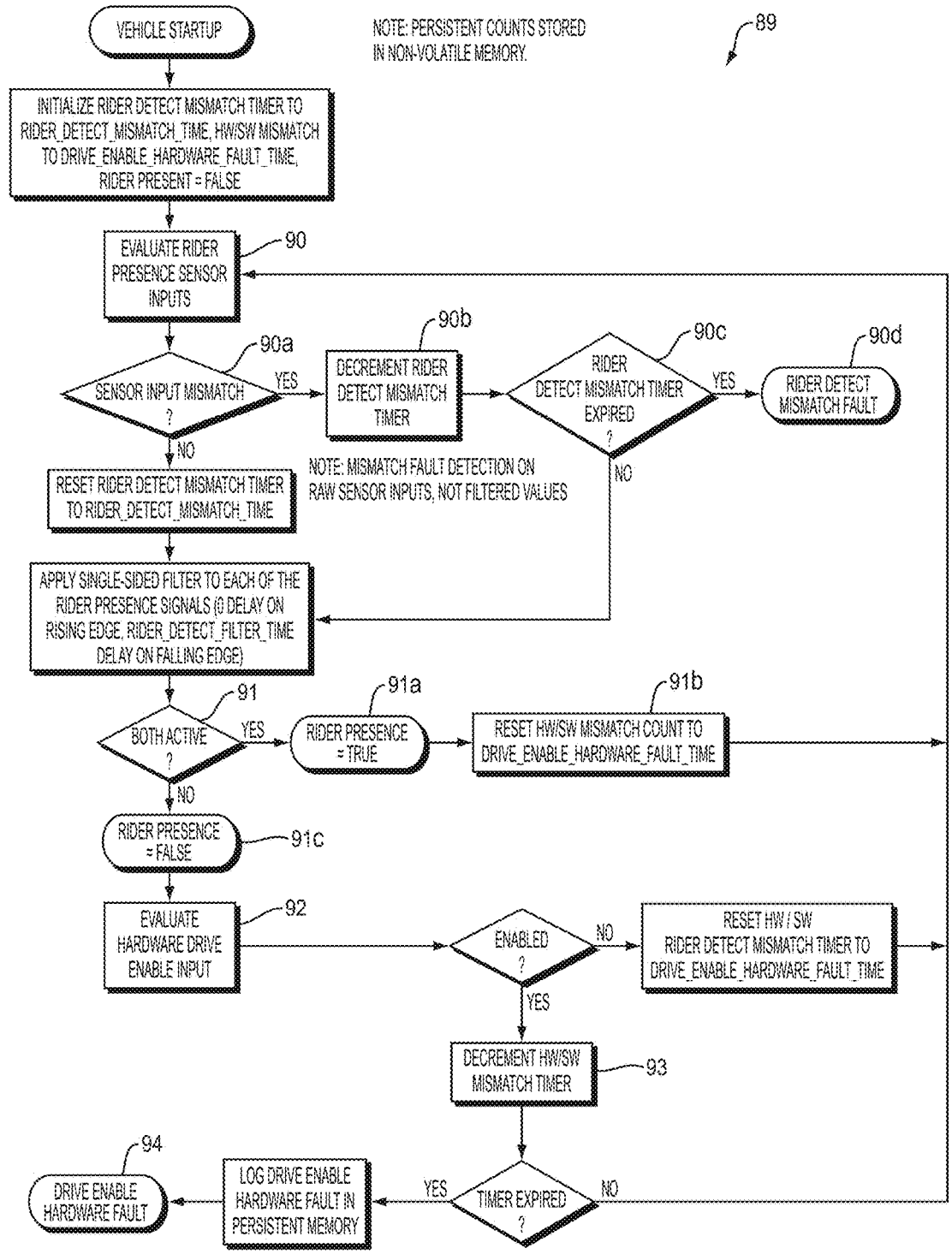
FIG. 5 shows a software logic diagram of a portion of a control function concerning detecting and requiring the presence of a rider on the vehicle in conjunction with the schematic of FIG. 2.

FIG. 5 is a software sequence diagram 89 which monitors rider presence from sensors 34 of FIG. 2. Evaluation of rider presence 90 includes evaluation of sensors 34 to determine a mismatch at 90*a*. If a mismatch is detected, a timer 90*b* is decremented to allow rider repositioning for a limited period of time. If the limited period of time is expired at 90*c*, a rider detect mismatch fault is issued at 90*d*. If the mismatch timer is not expired the sequence proceeds to step 91 to determine if both sensors indicate rider presence. If rider presence is determined as true 91*a*, a timer is reset 91*b* and the sequence is returned to evaluate rider presence sensor inputs at 90. If rider presence in step 91 is determined to be false 91*c*, the hardware drive enable input 108 of FIG. S6 is evaluated in step 92. If the hardware drive enable input is enabled a hardware/software mismatch timer is decremented at 93. If the hardware/software timer is not expired the sequence is returned to evaluating rider presence sensor inputs step 90. If the hardware/software mismatch timer is expired a drive enable hardware fault 94 is set.

Figure 6:
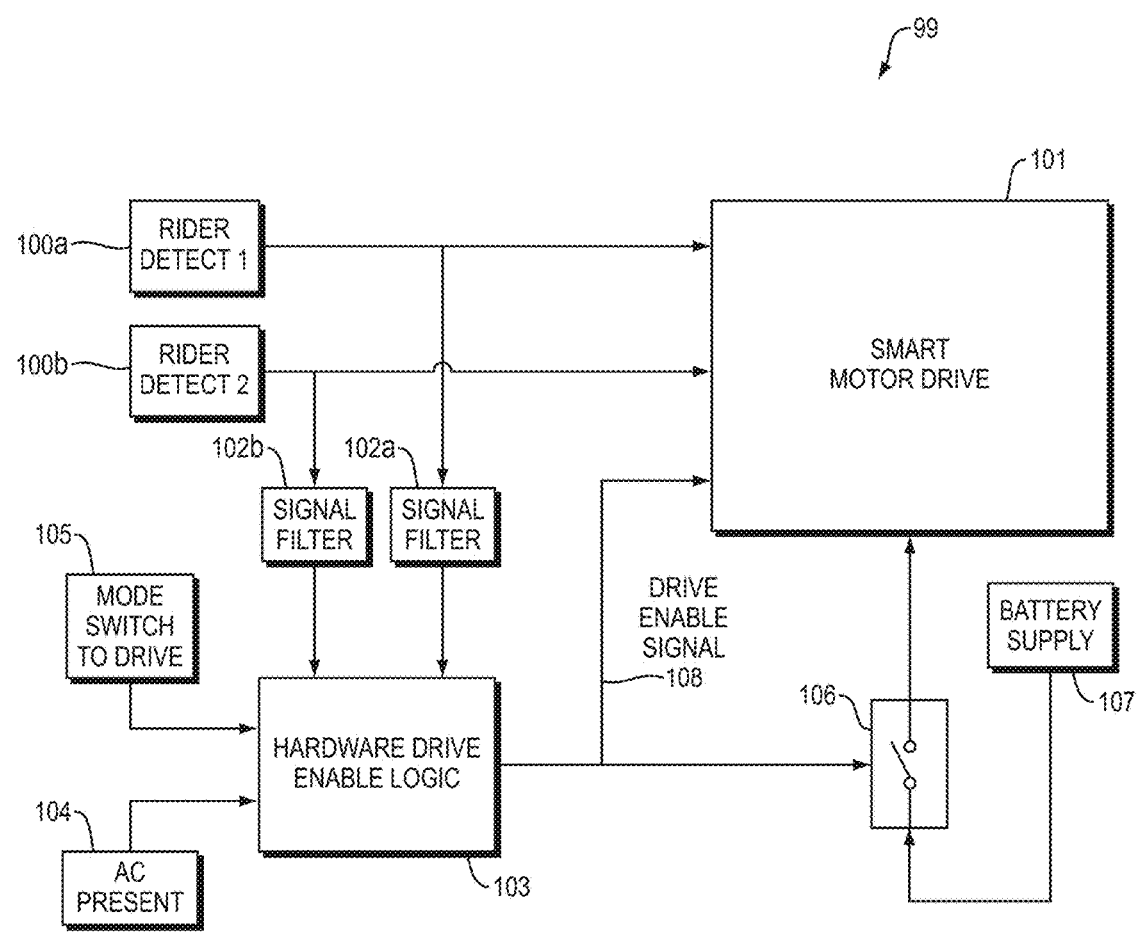
FIG. 6 shows a backup logic circuit for requiring rider presence to enable propulsion in conjunction with the schematic of FIG. 2.

FIG. 6 shows a circuit diagram of a rider detection system 99 connected to smart motor drive 101 of FIG. 2. System 99 contains redundant rider detection sensors 100*a*, 100*b*. These sensors actuate at the same time when a rider with appropriate mass mounts the vehicle. These sensors are configured so that a logical high corresponds with a detected rider. The raw output from both sensors 100*a*, 100*b* is tied to two digital inputs on the motor drive, 101/24L. Signals from sensors 100*a*, 100*b* are fed to respective hardware filters 102*a* and 102*b*. Filters 102*a* and 102*b* implement a short delay on a falling edge and no delay on a rising edge. This is intended to prevent short duration events from causing the drives to be disabled, such as when going over a bump or when the rider shifts their weight around the platform. The filtered rider detection signals are fed into a hardware logic circuit 103. Circuit 103 receives the inputs: the aforementioned filtered rider detection signals; an AC present signal 104, where a logic level high indicates AC is not present at the charger; and an input from a user switch 105 that is set to logic level high when drive mode is selected. From these inputs, the hardware logic circuit 103 generates a drive enable signal 108. If all of the inputs are logic level high (rider is present, AC is not present, drive mode selected), drive enable signal 108 is set high to indicate the motor drive should enable. Drive enable signal 108 is fed to the motor drive 101/24L such that the motor drive can enable/disable appropriately. Drive enable signal 108 is also fed to a switch circuit 106, which applies/removes power to the motor drive 101/24L from a battery supply 107 appropriately. Thus, the circuit 99 also serves as fault detection for an AC power source being attached to the vehicle when powered movement of the vehicle is attempted.

This architecture allows for several fault detection schemes. The motor drive 101/22 monitors both of the raw rider detection sensors 100*a*, 100*b* and issues a fault if these signals do not match for a given amount of time. This condition would suggest a failed sensor or faulty wiring. This condition could also occur transiently while the rider is mounting or dismounting the vehicle. Thus, the signals from sensors 100*a*, 100*b* must not match for 10 seconds before the fault is issued.

The motor drive software in drive 101/24L has a data item for rider presence. If the rider detection signals both transition from low to high, rider presence is set to "true" immediately. If the rider detection signals both transition from high to low, rider presence is set to "false" after a delay of 2 seconds. This delay is to accommodate the delay of approximately 1 second introduced into the hardware drive enable logic 103 by the signal filters 102*a*, 102*b*. If the drive enable signal 108 is high, but the software rider presence data item is set to "false", a fault is issued after 250 milliseconds. Thus, if the drive enable signal 108 is high, but either rider detection signal is low for a given time, a fault must have occurred in the hardware drive enable logic circuit 103, and a fault is issued.

What is claimed is:

1. A method for controlling an electrically driven transportation vehicle, the method comprising:
providing a state switch set to one of a forward or reverse state for applying forward or reverse drive power, respectively, to one or more drive motors;
sensing a speed of the vehicle;
sensing a rider selected level for a corresponding amount of drive current to be provided to the one or more drive motors;
sensing a presence of a rider on the vehicle using two or more sensors; and
changing the state switch to the other of the forward or reverse state, changing a direction of movement of the vehicle to correspond with the state switch, and providing the rider selected drive current amount to the one or more drive motors when:
the sensed speed is below a predetermined level;
the sensed rider selected drive current level is below a predetermined level; and
each of the two or more rider presence sensors is sensing the presence of the rider on the vehicle.

2. The method of claim 1, wherein sensing the presence of the rider further comprises filtering out short duration events where one or more of the sensors indicates the rider is not present.

3. The method of claim 1, further comprising:
sensing a plurality of conditions of the vehicle; and
changing the direction of movement of the vehicle to correspond with the state switch and providing the rider selected drive current amount to the one or more drive motors when none of the following conditions of the vehicle are sensed:
one or more fault conditions within an electrical system of the vehicle;
a battery temperature is greater than a predetermined temperature threshold level;
a battery charge level is less than a predetermined charge threshold level;
the vehicle is connected to an external connection of charging power; or
a braking mechanism is activated.

4. The method of claim 3, wherein the rider is sensed as present if a rider's weight is detected to be greater than or equal to a predetermined minimum weight.

5. The method of claim 3, wherein sensing an external connection for charging power comprises sensing a voltage on a recharging input of the vehicle.

6. The method of claim 1, wherein the vehicle comprises a pair of laterally opposed rear wheels coupled to the one or more drive motors, the method further comprising:
sensing a respective wheel speed of each wheel;
determining a difference in wheel speed between the laterally opposed wheels; and
changing the drive current provided to the one or more drive motors in response to the determined difference between the wheel speeds to limit calculated lateral acceleration on the vehicle when the difference in wheel speeds represents a turn radius for the vehicle that is less than a limit depending upon the sensed wheel speed.

7. An electrically driven vehicle, comprising:
a pair of laterally opposed rear wheels for supporting the vehicle;
one or more forward steered wheels;
one or more electric drive motors coupled to the pair of rear wheels to propel the vehicle;
a computerized controller for the one or more electric drive motors having a memory storing instructions which when executed cause the controller to:
sense a state switch set to a forward or reverse state for applying forward or reverse drive power, respectively, to the one or more electric drive motors;
sense a speed of the vehicle;
sense a rider selected level for a corresponding amount of drive power to be provided to the one or more drive motors;
sense a presence of a rider on the vehicle using two or more sensors; and
change the state switch to the other of the forward or reverse state, change a direction of movement of the vehicle to correspond with the state switch, and provide the rider selected drive power amount to the one or more drive motors when:
the sensed speed is below a predetermined level;
the sensed rider selected power level is below a predetermined level; and
each of the two or more rider presence sensors is sensing the presence of the rider on the vehicle.

8. The vehicle of claim 7, wherein the memory further includes instructions which when executed cause the controller to:
sense a plurality of conditions of the vehicle; and
change the direction of movement of the vehicle to correspond with the state switch and provide the rider selected drive power amount to the one or more drive motors when none of the following conditions of the vehicle are sensed:
one or more fault conditions within an electrical system of the vehicle;
a battery temperature is greater than a predetermined temperature threshold level;
a battery charge level is less than a predetermined charge threshold level;
the vehicle is connected to an external connection of charging power; or
a braking mechanism is activated.

9. The vehicle of claim 7, wherein the instructions which cause the controller to sense the presence of the rider further comprise instructions to cause the controller to filter out short duration events where one or more of the sensors indicates the rider is not present.

10. The vehicle of claim 7, wherein the memory further comprises instructions which when executed cause the controller to:
sense a respective wheel speed of each wheel;
determine a difference in wheel speed between the rear wheels; and
change the power provided to the one or more drive motors in response to the determined difference between the wheel speeds to limit calculated lateral acceleration on the vehicle when the difference in wheel speeds represents a turn radius for the vehicle that is less than a limit depending upon the sensed wheel speed.

11. The vehicle of claim 10, wherein the one or more electric drive motors comprises a separate respective drive motor coupled to each of the pair of rear wheels, and wherein the memory further comprises instructions which when executed cause the controller to:
sense user controlled steering of the one or more forward steered wheels and determine power to the separate respective drive motors in response to the sensed steering to match rotation of the rear wheels with the user controlled steering.

12. The vehicle of claim 7, wherein the instructions which cause the controller to sense the presence of the rider further comprise instructions to cause the controller to only sense a rider being present if a sensed rider weight is greater than or equal to a predetermined minimum weight.

* * * * *